(12) United States Patent
Licata et al.

(10) Patent No.: US 10,810,909 B2
(45) Date of Patent: Oct. 20, 2020

(54) LABELED MOLDED CONTAINER HAVING LIGHT CONTRAST AT THREE-DIMENSIONAL END PORTION

(71) Applicant: YUPO CORPORATION, Tokyo (JP)

(72) Inventors: Mike Licata, Chesapeake, VA (US); Darren Parzych, Atlanta, GA (US); Tom Schell, Oil City, PA (US); Kazuyuki Kimura, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 20 days.

(21) Appl. No.: 16/313,608

(22) PCT Filed: Jun. 27, 2017

(86) PCT No.: PCT/US2017/039528
§ 371 (c)(1),
(2) Date: Dec. 27, 2018

(87) PCT Pub. No.: WO2018/005512
PCT Pub. Date: Jan. 4, 2018

(65) Prior Publication Data
US 2019/0147774 A1   May 16, 2019

Related U.S. Application Data

(60) Provisional application No. 62/355,471, filed on Jun. 28, 2016.

(51) Int. Cl.
*G09F 3/02* (2006.01)
*B32B 27/36* (2006.01)
(Continued)

(52) U.S. Cl.
CPC .................. *G09F 3/02* (2013.01); *B32B 1/02* (2013.01); *B32B 1/08* (2013.01); *B32B 3/263* (2013.01);
(Continued)

(58) Field of Classification Search
CPC .. B32B 1/02; B32B 1/08; B32B 3/263; B32B 5/10; B32B 5/16; B32B 5/18; B32B 5/30;
(Continued)

(56) References Cited

U.S. PATENT DOCUMENTS 4,089,922 A   5/1978  Saito et al.
4,320,041 A   3/1982  Abe et al.
(Continued)

FOREIGN PATENT DOCUMENTS

FR   2595659 A1 *  9/1987   ............... B65D 1/40
JP   56-2149           1/1981
(Continued)

OTHER PUBLICATIONS

International Search Report in International Patent Application No. PCT/US2017/039528, dated Aug. 24, 2017.
(Continued)

*Primary Examiner* — Bryon P Gehman
(74) *Attorney, Agent, or Firm* — Greenblum & Bernstein, P.L.C.

(57) ABSTRACT

Disclosed is a labeled molded container having a container main body and a label, wherein a label surface is provided with a flat portion, a concave-convex pattern, and an edge portion between the convex portion or concave portion and the flat portion, and wherein when observing the labeled molded container from a surface-side thereof by illuminating light from a backside of the container, the edge portion is seen brighter than the flat portion and the concave-convex pattern.

18 Claims, 1 Drawing Sheet

(51) Int. Cl.
| | |
|---|---|
| *B32B 3/26* | (2006.01) |
| *B32B 27/32* | (2006.01) |
| *B32B 5/10* | (2006.01) |
| *B32B 27/06* | (2006.01) |
| *B32B 7/12* | (2006.01) |
| *B32B 27/30* | (2006.01) |
| *B32B 27/28* | (2006.01) |
| *B32B 5/16* | (2006.01) |
| *B32B 5/18* | (2006.01) |
| *B32B 5/30* | (2006.01) |
| *B32B 27/20* | (2006.01) |
| *B32B 1/08* | (2006.01) |
| *B65D 1/34* | (2006.01) |
| *G09F 7/16* | (2006.01) |
| *B32B 27/22* | (2006.01) |
| *B32B 27/14* | (2006.01) |
| *B32B 27/34* | (2006.01) |
| *B32B 1/02* | (2006.01) |
| *B32B 27/08* | (2006.01) |
| *B65D 25/36* | (2006.01) |

(52) U.S. Cl.
CPC ............ *B32B 5/10* (2013.01); *B32B 5/16* (2013.01); *B32B 5/18* (2013.01); *B32B 5/30* (2013.01); *B32B 7/12* (2013.01); *B32B 27/065* (2013.01); *B32B 27/08* (2013.01); *B32B 27/14* (2013.01); *B32B 27/205* (2013.01); *B32B 27/22* (2013.01); *B32B 27/286* (2013.01); *B32B 27/302* (2013.01); *B32B 27/32* (2013.01); *B32B 27/325* (2013.01); *B32B 27/34* (2013.01); *B32B 27/36* (2013.01); *B32B 27/365* (2013.01); *B65D 1/34* (2013.01); *B65D 25/36* (2013.01); *G09F 7/165* (2013.01); *B32B 2255/04* (2013.01); *B32B 2255/10* (2013.01); *B32B 2264/0214* (2013.01); *B32B 2264/0235* (2013.01); *B32B 2264/0257* (2013.01); *B32B 2264/0278* (2013.01); *B32B 2264/10* (2013.01); *B32B 2264/102* (2013.01); *B32B 2264/104* (2013.01); *B32B 2270/00* (2013.01); *B32B 2307/302* (2013.01); *B32B 2307/41* (2013.01); *B32B 2307/412* (2013.01); *B32B 2307/518* (2013.01); *B32B 2307/54* (2013.01); *B32B 2307/72* (2013.01); *B32B 2307/732* (2013.01); *B32B 2439/00* (2013.01); *B32B 2439/40* (2013.01); *B65D 2203/02* (2013.01); *G09F 2003/0272* (2013.01)

(58) Field of Classification Search
CPC ......... B32B 7/12; B32B 27/065; B32B 27/08; B32B 27/14; B32B 27/205; B32B 27/22; B32B 27/286; B32B 27/302; B32B 27/32; B32B 27/325; B32B 27/34; B32B 27/36; B32B 27/365; B32B 2255/04; B32B 2255/10; B32B 2264/0214; B32B 2264/0235; B32B 2264/0257; B32B 2264/0278; B32B 2264/10; B32B 2264/102; B32B 2270/00; B32B 2307/41; B32B 2307/412; B32B 2307/518; B32B 2307/54; B32B 2307/72; B32B 2307/732; B32B 2439/00; B32B 2439/40; B65C 3/00; B65D 1/02; B65D 1/0215; B65D 1/34; B65D 1/40; B65D 23/08; B65D 23/0864; B65D 25/36; B65D 2203/02; G09F 3/02; G09F 7/165; G09F 2003/0272
USPC ...................................... 206/459.5
See application file for complete search history.

(56) References Cited

U.S. PATENT DOCUMENTS

| | | | |
|---|---|---|---|
| 5,071,597 A | 12/1991 | D'Amato et al. | |
| 5,223,315 A | 6/1993 | Katsura et al. | |
| 5,475,533 A * | 12/1995 | Steenblik | G02B 5/00 |
| | | | 359/455 |
| 6,248,441 B1 | 6/2001 | Anderson et al. | |
| 6,551,671 B1 | 4/2003 | Nishizawa et al. | |
| 6,569,276 B2 | 5/2003 | Anderson et al. | |
| 6,620,473 B2 | 9/2003 | Nishizawa et al. | |
| 6,749,915 B2 * | 6/2004 | Tachi | B29C 49/24 |
| | | | 428/156 |
| 6,838,138 B1 | 1/2005 | Akiyama et al. | |
| 7,006,294 B2 * | 2/2006 | Steenblik | G02B 30/27 |
| | | | 359/619 |
| 10,019,914 B2 * | 7/2018 | Miya | B65D 23/0864 |
| 10,316,226 B2 * | 6/2019 | Free | B32B 7/12 |
| 2002/0150706 A1 | 10/2002 | Tachi et al. | |
| 2007/0158230 A1 * | 7/2007 | McGuire | A45D 44/00 |
| | | | 206/459.5 |
| 2009/0173654 A1 * | 7/2009 | Steenblik | G09F 19/12 |
| | | | 206/459.5 |
| 2011/0215018 A1 * | 9/2011 | Schneider | C09J 5/06 |
| | | | 206/459.5 |
| 2015/0083630 A1 | 3/2015 | Miya et al. | |
| 2017/0129654 A1 | 5/2017 | Funato et al. | |

FOREIGN PATENT DOCUMENTS

| | | | |
|---|---|---|---|
| JP | 56-106940 | | 8/1981 |
| JP | 56-157445 | | 12/1981 |
| JP | 58-118843 | | 7/1983 |
| JP | 2006206162 A | * | 8/2006 |

OTHER PUBLICATIONS

International Preliminary Report on Patentability in International Patent Application No. PCT/US2017/039528, dated Jan. 10, 2019.

* cited by examiner

LABELED MOLDED CONTAINER HAVING LIGHT CONTRAST AT THREE-DIMENSIONAL END PORTION

The present application claims the benefit of U.S. Provisional Application No. 62/355,471 filed on Jun. 28, 2016, the disclosure of which is expressly incorporated by reference herein in its entirety.

TECHNICAL FIELD

The disclosure relates to a labeled container that is to be obtained by an in-mold forming method.

Also, the disclosure relates to an in-mold label.

A method of manufacturing the labeled container is as follows.

The label is set in advance in a mold so that a surface-side, on which the label has been printed, is contacted to a wall surface of the mold. Then, hollow forming, injection forming, vacuum forming or air-pressure forming is performed to manufacture a labeled container.

In the related art, U.S. Pat. No. 6,620,473 (Nishizawa et al.) discloses an in-mold label where one surface of a base material layer (I) of a thermoplastic resin film is printed and an opposite surface of the base material layer (I) is provided with a thermal adhesiveness resin layer (II).

Also, regarding the in-mold forming, in addition to the printing, U.S. Pat. No. 5,071,597 (D'Amato et al.) discloses hologram decoration and U.S. Pat. No. 5,223,315 (Katsura et al.) discloses metal foil decoration.

Also, U.S. Pat. No. 6,569,276 (Anderson) discloses decoration by a method of denting a mold to form a protrusion on a molded product, which receives the attention.

However, the decoration made by the method of forming a protrusion on an in-mold molded product has only stereoscopic visual effects and is limited with respect to an eye-catch effect.

Means for Solving the Problems

The disclosure provides a labeled molded container having a label thermally fused on a surface of an in-mold molded container wherein a surface of the label is formed with a flat portion, a concave-convex pattern and an edge portion between the convex portion or concave portion and the flat portion to include the flat portion and the convex portion or concave portion or both portions and the label is provided with a void in advance that is likely to be crushed upon in-mold forming.

Effects of the Disclosure

According to the disclosure, upon the in-mold forming, the label surface is formed with the flat portion, the concave-convex pattern and the edge portion between the convex portion or concave portion and the flat portion. At the same time, the void in the label of the edge portion is likely to be crushed by heat and pressured applied from the resin.

For this reason, the light transmission is improved at the edge portion of the obtained labeled molded container and the light contrast is obtained.

As a result, it is possible to provide the labeled molded container having a high eye-catch effect, which cannot be obtained by the decoration method of the related art.

In the specification, a main component indicates a component having a highest mass ratio in a composition. Also, when referring to an A structure and a B structure in composition of copolymer, they indicate a structure originating in a monomer A and a structure originating in a monomer B in copolymer.

In the specification, the concave-convex pattern includes a pattern of only concave portions and a pattern of only convex portions.

A labeled molded container of the disclosure has container main body and a label, a label surface is provided with a flat portion, a concave-convex pattern and an edge portion between the convex portion or concave portion and the flat portion, and when observing the labeled molded container from a surface-side thereof by illuminating light from a backside of the container, the edge portion is seen brighter than the flat portion and the concave-convex pattern.

Also, the labeled molded container of the disclosure has a void decrease ratio of 15 to 99%, which is expressed by the following equation (1), $$(1-N_{12}/N_{11}) \times 100 \qquad (1)$$

$N_{11}$: the number of interface voids in a thickness direction on a convex portion apex surface or concave portion bottom surface $N_{12}$: the number of interface voids in a thickness direction at the edge portion.

Also, in the labeled molded container of the disclosure, the label consists of a biaxially stretched layer or a biaxially stretched layer and an unstretched layer.

Physical Properties of Labeled Molded Container:

[Void of Cross Section]

When observing the labeled molded container of the disclosure from the surface-side thereof by illuminating light from the backside of the container with seeing in front of a label of a bottle, the edge portion is seen brighter than the flat portion and the concave-convex pattern. In this structure, when illuminating the light so as to penetrate the label, the light is difficult to pass through an apex of the convex portion and the flat portion of the label, and can easily pass through the edge portion between the apex portion of the convex portion and the flat portion. Therefore, an outline of the convex portion is likely to be seen bright. Likewise, the light is difficult to pass through a bottom surface portion of the concave portion of the label and can easily pass through the edge portion between the bottom surface portion and the flat portion. Therefore, an outline of the concave portion is likely to be seen bright. This phenomenon is referred to as light contrast.

Due to the light contrast, when the convex portion or the concave portion is a letter or a figure, an outline of the letter or figure is seen to brightly stand out, so that a new design is obtained.

According to the labeled molded container of the disclosure, when the convex portion or the concave portion is provided in a region in which the label is thermally fused, a wall of the bottle and the label are integrated to form the convex portion or concave portion.

The light contrast is not made from the wall of the bottle but is made by the thermally fused label.

Specifically, when porosities of the label are different depending on places, since the light is scattered by the voids at a place in which the porosity is low, the light is difficult to penetrate, and since the light is difficult to be scattered at a place in which the porosity is high, the light is easy to penetrate.

In the disclosure, the light is easy to penetrate the edge portion between the apex portion of the convex portion and the flat portion of the label. Therefore, the outline of the convex portion is likely to be seen bright.

From a standpoint of increasing the light contrast, the void decrease ratio expressed by the following equation (1) is 15 to 99%, $$(1-N_{12}/N_{11}) \times 100 \tag{1}$$

$N_{11}$: the number of interface voids in a thickness direction on a convex portion apex surface or concave portion bottom surface $N_{12}$: the number of interface voids in a thickness direction at the edge portion.

The void decrease ratio is preferably 30% or higher, more preferably 50% or higher, and further preferably 65% or higher. In the meantime, the void decrease ratio is preferably 96% or less, and more preferably 90% or less.

Figure 1:
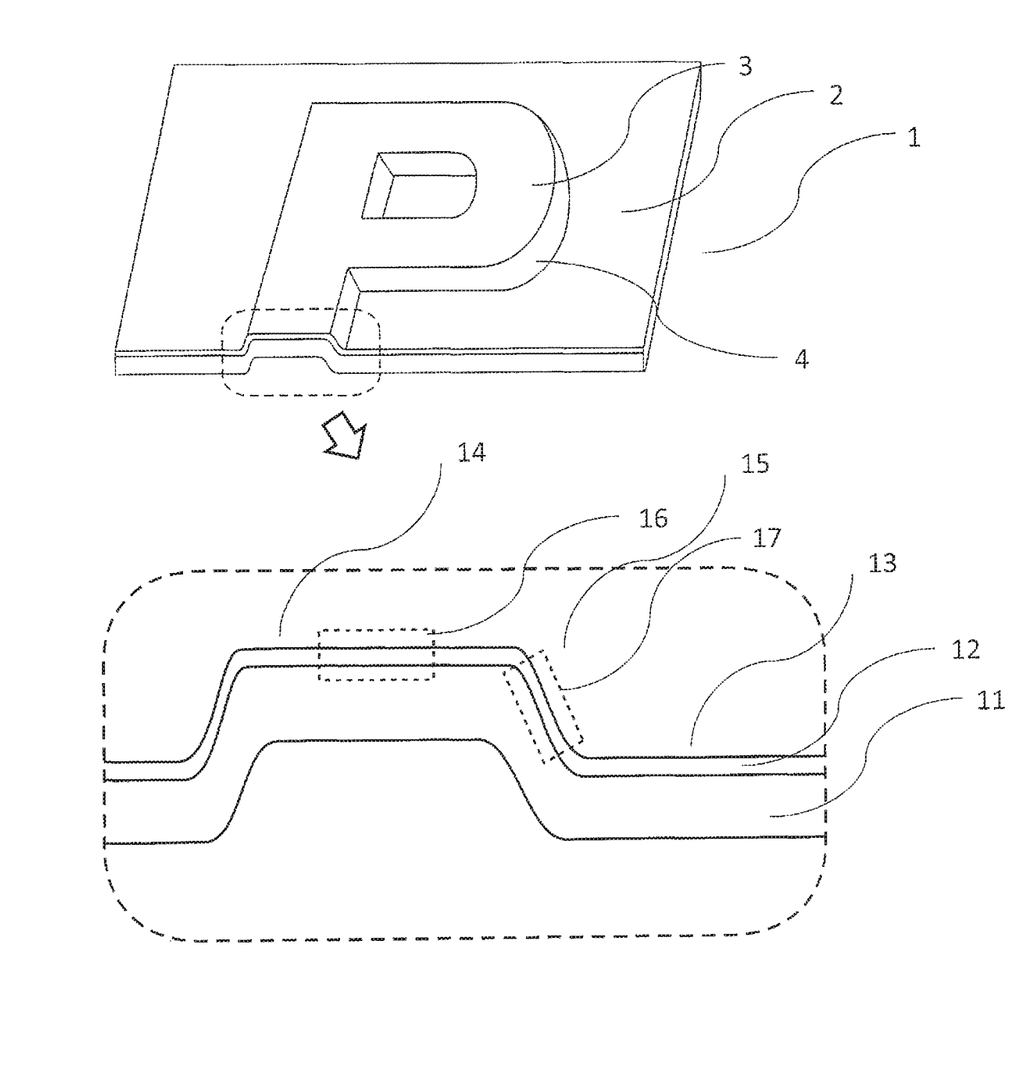
Fig. 1 shows a labeled molded container.

In the meantime, the number of interface voids in the thickness direction of a label cross section is calculated as follows, with reference to FIG. 1.

When sampling, a sample is cut to pass a center of the apex portion of the convex portion or the bottom surface portion of the concave portion of a measurement target.

The voids in the label can be observed by making a container cross section as a sample, which includes the convex portion or the concave portion, and observing the cross section with an electron microscope. The sample is embedded with an epoxy resin, which is then solidified. Then, a cut surface is made to be parallel with a thickness direction of a film (i.e., to be perpendicular to a surface direction) by using microtome. The cut surface is metalized with gold, gold-palladium or the like so as not to cause charge-up. Subsequently, the cross section is observed at any magnification (for example, a magnification of 500 times) with which it can be easily observed by a scanning electron microscope. The number of voids is obtained by drawing a line in the thickness direction of the cross section and counting the number of voids on the line. In this case, when the number of voids is obtained by averaging values measured at ten or more measurement points, the accuracy of the void decrease ratio is improved.

A mode of an image analysis depends on a specification of image analysis software. However, the image analysis is preferably performed with a gray scale image.

Upon the image analysis, when a material forming the void is included in the void, the void formation material (for example, inorganic fine powder) is treated as the void. The image analysis software capable of coloring a part to be treated as the void is preferably used.

As a result of the image analysis, when a decrease ratio of the number of interface voids of the edge portion is higher with respect to the number of interface voids in the thickness direction of the convex portion apex surface, the light contrast is expressed stronger (Table 4). This is also the same for the concave portion bottom surface and the edge portion.

A state where the porosities of the label thermally fused to the labeled molded container are different between the apex portion or the bottom surface portion and a connection portion can be made by designing so that the void of the connection portion is more likely to be crushed by heat upon the in-mold forming than the void of the apex portion or the bottom surface portion.

Base Material Layer (I) of In-mold Label:

The in-mold label has at least one porous layer selected from a group of a stretched layer, a foamed layer and a solvent extract layer and is favorably used for the labeled molded container of the disclosure. Among them, the stretched layer is preferably adopted due to simplicity of film formation.

[Thermoplastic Resin]

As the base material layer (I) of the in-mold label, a material that can be easily thermally fused to the edge portion upon the in-mold forming is preferably used.

Examples of the material include a thermoplastic resin, for example, an ethylene-based resin such as high-density polyethylene, medium-density polyethylene and the like;

a olefinic resin such as ethylene-based resin, propylene-based resin and the like;

a olefinic copolymer resin such as polymethyl-1-pentene, ethylene-cyclic olefin copolymer and the like;

a polyamide-based resin such as nylon-6, nylon-6,6, nylon-6,10, nylon-6,12, nylon-6,T and the like;

a thermoplastic polyester-based resin such as polyethylene terephthalate and copolymer thereof, polyethylene naphthalate, aliphatic polyester and the like; and other thermoplastic resins such as polycarbonate, syndiotactic polystyrene, polyphenylene sulfide and the like.

The two or more resins may be mixed and used.

A melting point of the resin, which is the main component of the base material layer (I) of the in-mold label, is preferably the same as or higher than a melting point of a resin, which is a main component of an adhesive layer (II) of the in-mold label, from a standpoint of the in-mold forming. In the disclosure, the thermal fusion is required inside the base material layer (I) upon the in-mold forming. From this standpoint, the melting point of the thermoplastic resin is preferably 110° C. to 260° C., and more preferably 110° C. to 150° C.

From the same standpoint, a thermoplastic resin having a melting point lower than a melting point of a resin, which is most contained in the container main body of the labeled molded container by mass scale, is preferably contained by 10 to 80%.

As the resin satisfying the condition of the melting point, the olefinic resin is preferably used. Also, among the olefinic resins, the propylene-based resin and ethylene-based resin are preferable from standpoints of chemical resistance, cost and the like.

As the propylene-based resin, homopolymers of propylene monomers and propylene/α-olefin copolymer having propylene monomers as a main component are preferable.

As the propylene homopolymer, isotactic, syndiotactic, and various other tactic propylene homopolymers may be exemplified.

Also, as the α-olefin monomer, ethylene, butene-1, hexene-1, heptene-1, 4-methylpentene-1 and the like may be exemplified.

The propylene/α-olefin copolymer may be binary, ternary, or quaternary copolymer, and may be random copolymer or block copolymer.

Particularly, as the ethylene-based resin, low-density polyethylene (LDPE), linear low-density polyethylene (LLDPE) and high-density polyethylene (HDPE) are preferable.

[Void Formation Material]

The base material layer (I) of the in-mold label is required to form the voids.

The voids can be made by mixing the thermoplastic resin and inorganic fine powders or organic filler to form a film and stretching the same.

Also, the voids can be made by laminating a foamed material on a film or by laminating a material before foaming on a film and foaming the same. At this time, the foaming method may be a physical foaming method or a chemical foaming method.

Also, the voids can be made by blending a material, which is immiscible with the thermoplastic resin and can be easily removed, with the thermoplastic resin to form a film and subjecting the same to removing processing. At this time, the film may be stretched between the film formation and the removing processing.

When inorganic fine powder is added as the void formation material, a particle size of the inorganic fine powder is preferably 0.1 μm to 15 μm.

From the standpoint of the easy void formation for the thermal fusion inside the base material layer (I) upon the in-mold forming, the particle size of the inorganic fine powder is more preferably 0.5 μm or greater, and further preferably 0.7 μm or greater. On the other hand, from a standpoint of uniform stretching of the base material layer (I), the particle size of the inorganic fine powder is more preferably 10 μm or smaller, and further preferably 5 μm or smaller.

As the inorganic fine powder, heavy calcium carbonate, light calcium carbonate, baked clay, silica, diatomaceous earth, talc, titanium oxide, barium sulfate, alumina and the like may be exemplified.

When organic filler is added as the void formation material, a resin different from the thermoplastic resin, which is the main component, is preferably selected, and a resin, which is immiscible with the thermoplastic resin, is more preferably selected.

Also, in order to form the void, a resin having a higher melting point or glass transition point than the melting point of the thermoplastic resin, which is the main component, is preferably selected. In addition to this, a resin, which is immiscible with the thermoplastic resin, is particularly preferably selected.

For example, when the thermoplastic resin film is the olefinic resin film, examples of the favorable organic filler include polymers of polyethylene terephthalate, polybutylene terephthalate, polycarbonate, nylon-6, nylon-6,6, nylon-6,T, cyclic olefin, polystyrene, polymethacrylate and the like.

Also, a resin having a higher melting point (for example, 170° C. to 300° C.) than the melting point of the olefinic resin may be exemplified.

Also, a resin having a higher glass transition point (for example, 170° C. to 280° C.) than the melting point of the olefinic resin may be exemplified.

[Additives]

Following additives may be added to the base material layer (I) of the in-mold label without deteriorating the effects of the disclosure.

As stabilizer, sterically hindered phenol-based, phosphorus-based and amine-based heat stabilizers, and sterically hindered amine-based, benzotriazole-based and benzophenone-based light stabilizers may be exemplified.

An addition amount of the stabilizers is typically 0.001% to 2% by mass, and more preferably 0.01% to 1% by mass.

As dispersant or lubricant, a snare coupling agent, higher fatty acids such as oleic acid and stearic acid, a metal soap, polyacrylic acid, polymethacrylic acid, or salts thereof may be exemplified.

When the dispersant or the lubricant is used, the effect of dispersing the inorganic fine powders is improved.

An addition amount of the dispersant or the lubricant is typically 0.01% to 4% by mass, and more preferably 0.05% to 3% by mass.

Adhesive Layer (II) of In-Mold Label:

In the disclosure, the base material layer (I) may be used alone as the in-mold label upon the in-mold forming (first aspect). However, the adhesive layer (II) may be provided by a coextrusion method or an extrusion lamination method (second aspect), like the normal in-mold label. Also, the adhesive layer (II) may be provided by a coating method (third aspect).

Since the first aspect is the same as the base material layer, the description thereof is omitted.

Second Aspect

[Thermoplastic Resin for Adhesive Layer (II)]

In the second aspect, a resin, which is the main component of the adhesive layer (II) of the in-mold label, is preferably a thermoplastic resin which is fused upon the in-mold forming and is cooled and solidified after the forming.

The resin, which is the main component of the adhesive layer (II), is more preferably a ethylene-based resin which causes the thermal fusion inside the base material layer (I) by the limited heat quantity of parison and is thermally fused to the container at the adhesive layer (II).

As the ethylene-based resin, ethylene-based copolymers such as high-pressure polyethylene of low-density or medium-density of 0.900 to 0.935 $g/cm^3$, straight-chain polyethylene having a density of 0.880 to 0.940 $g/cm^3$, ethylene/vinyl acetate copolymer, ethylene/acrylic acid copolymer, ethylene/acrylic acid alkyl ester copolymer, ethylene/methacrylic acid alkyl ester copolymer (the alkyl group has 1 to 8 carbon atoms), metal salts of ethylene/methacrylic acid copolymer (Zn, Al, Li, K, Na and the like) and the like may be exemplified.

Among them, as the high-pressure polyethylene, a resin having a crystallinity (X-ray method) of 10% to 60% and a number average molecular weight of 10,000 to 40,000 is preferable.

Also, as the straight-chain polyethylene, copolymer including an ethylene structure of 40% to 98% by mass and an α-olefin structure of 60% to 2% by mass having 3 to 30 carbon atoms may be exemplified from a standpoint of the thermal adhesiveness with the container.

The copolymer is preferably obtained by reacting ethylene and α-olefin with a metallocene catalyst.

As the metallocene catalyst, a metallocene/alumoxane catalyst or a catalyst consisting of a metallocene compound as disclosed in the international publication pamphlet WO92/001723 and a compound, which reacts with the metallocene compound to form stable anions, is particularly preferable.

In the adhesive layer (II) of the in-mold label, the ethylene-based resin may be included alone or as a mixture of two or more kinds.

A melting point of the resin, which is the main component of the adhesive layer (II), is preferably 80° C. to 130° C., and more preferably 90° C. to 120° C.

The melting point of the resin, which is the main component of the adhesive layer (II), is preferably lower than the melting point of the thermoplastic resin, which is the main component of the base material layer (I), 15° C. or higher, and preferably 15° C. to 90° C. When a difference of the melting points is less than 15° C., a surface and a backside of a sheet are likely to be fused during sheet roll winding upon the manufacturing, so that the operability is deteriorated.

[Anti-blocking Agent]

When performing cutting, punching, printing and the like before the in-mold forming, an anti-blocking agent is preferably applied to the in-mold label so as to prevent the labels from being stuck to each other.

As the anti-blocking agent, inorganic fine particle or lubricant may be exemplified. The inorganic fine particle and the lubricant may be used individually or in combination.

(Lubricant)

As the lubricant, fatty acid amide, organic fine powder, inorganic fine powder and the like may be exemplified. Among them, fatty acid amide is preferable.

As the fatty acid amide, saturated fatty acid amide, unsaturated fatty acid amide, saturated fatty acid substituted amide, unsaturated fatty acid substituted amide, saturated fatty acid bis amide, unsaturated fatty acid bis amide and the like may be exemplified.

Also, the molecular weight of the fatty acid amide is preferably 300 or greater from standpoints that the fatty acid amide is difficult to separate from the film surface upon heating or stretching during the manufacturing of the in-mold label and that the fatty acid amide is not excessively bled out to the surface even though it takes much time from the manufacturing to the printing. On the other hand, the molecular weight of the fatty acid amide is preferably 1,000 or less from a standpoint that the fatty acid amide is bled out to the surface so as to secure intended slidability.

Also, a melting point of the fatty acid amide is preferably 60° C. or higher from the standpoint that the fatty acid amide is difficult to separate from the film surface upon heating or stretching during the manufacturing of the in-mold label. Also, the melting point of the fatty acid amide is preferably 160° C. or lower from the standpoint that the fatty acid amide is bled out to the surface so as to secure intended slidability.

As the fatty acid amide particularly favorable for the disclosure, behenic acid amide, methylene bis stearic acid amide, ethylene bis lauric acid amide, ethylene bis stearic acid amide, ethylene bis oleic acid amide, ethylene bis erucic acid amide, N-stearyl erucamide, N-stearyl oleylamide and the like may be exemplified.

The lubricant is preferably blended in an amount of 0.05% by mass or higher from a standpoint of securing the intended slidability in the adhesive layer (II). On the other hand, the lubricant is preferably blended in an amount of 10% by mass or less from a standpoint of suppressing blister upon the in-mold forming or label adhesion strength lowering of the labeled molded container. Also, the lubricant is more preferably blended in an amount of 0.1% to 5% by mass.

When blending the lubricant with the adhesive layer (II), the fatty acid amides of one or two or more kinds are kneaded with the resin, which is the main component of the adhesive layer (II), by an extruder or a kneader to make a composition, which is then used as the material of the adhesive layer.

As the organic fine powder, polymethylmethacrylate fine particle, cross-linked polymethylmethacrylate fine particle, cross-linked polystyrene fine particle, silicon resin fine particle, polytetrafluoroethylene fine particle and the like may be exemplified.

Among them, cross-linked polymethylmethacrylate fine particle and silicon resin fine particle are preferable from standpoints of kneading performance with the thermoplastic resin in the adhesive layer (II) and heat resistance.

As the inorganic fine powder, heavy calcium carbonate, light calcium carbonate, clay, alumino-silicate, sodium calcium alumino-silicate, silica, soda-lime glass, talc, titanium oxide, barium sulfate and the like may be exemplified.

Among them, the fine powder having a spherical shape of which an aspect ratio (long diameter/short diameter) of a filler particle is small or having a substantially cubic shape is preferable from standpoints that the thermal adhesiveness with the thermoplastic resin is not deteriorated and the high effect is achieved with a small amount of blending. Also, from the same standpoints, the fine powders of which a particle size distribution is narrow are preferable.

From the standpoint of securing the intended slidability, the average particle size of the fine powders is preferably 0.5 µm or greater, and more preferably 1 µm or greater.

Also, from standpoints that the fine powder is difficult to separate from the adhesive layer and particle aggregation to deteriorate the outward appearance is suppressed, the average particle size of the fine powders is preferably 15 µm or less, and more preferably 10 µm or less.

Also, when the average particle size of the fine powders is close to or greater than the thickness of the adhesive layer (II), the intended slidability is more effectively obtained, which is therefore preferable, because protrusions are generated on the surface of the adhesive layer (II). However, when the average particle size of the fine powders is excessively greater than the thickness of the adhesive layer (II), the fine powders are likely to separate. Therefore, the average particle size of the fine powders is preferably within a range of 0.7 to 1.1 when the thickness of the adhesive layer (II) is set to 1.

Also, from a standpoint of good balance of the thermal adhesiveness, slidability and blocking prevention property of the label, it is preferable that the average particle size of the fine powders is greater than the thickness of the adhesive layer (II) and the particle size distribution of the fine powders is narrow.

When the content of the fine powders is excessively low, it is difficult to secure the intended slidability and the blocking prevention property. On the other hand, when the content of the fine powders is excessively high, the adhesion strength of the label tends to decrease. Therefore, the content of the fine powders is preferably 0.03% to 15% by mass, and more preferably 0.05% to 10% by mass with respect to the total mass of the adhesive layer (II).

When blending the fine powders with the adhesive layer (II), the organic fine powders or the inorganic fine powders of one or two or more kinds are kneaded with the resin, which is the main component of the adhesive layer (II), by an extruder or a kneader to make a composition, which is then used as the material of the adhesive layer.

The average particle size of the fine powders is calculated in following order. A sample for cross section observation is observed at an appropriate magnification (for example, a magnification of 1,000 times) by a scanning electron microscope and a photograph image thereof is captured. From the photograph image, an average value of 100 randomly selected particles sizes (long diameters) in the sample is calculated. Thereby, the average particle size is calculated.

[Additives]

The adhesive layer (II) may contain other well-known additives for the resin within a range that does not deteriorate the thermal adhesiveness. Examples of the other additives for the resin may include dyes, nucleating agents, plasticizers, release agents, fire retardants, anti-oxidants, light stabilizers, ultraviolet absorbers and the like. From a standpoint of exhibiting the performance of the other additives for the resin, an addition amount of the additive for the resin is preferably 0.01% by mass or higher, and more preferably 0.03% by mass or higher with respect to the total mass of the adhesive layer (II). Also, the addition amount of the other additives for the resin is preferably 10% by mass or less, and more preferably 5% by mass or less with respect to the total mass of the adhesive layer (II) from a standpoint of suppressing the additive from being deposited on a dice during the continuous manufacturing of the label.

Third Aspect

[Organic Solvent Soluble Resin or Aqueous Resin Emulsion]

In the third aspect, after the forming, the adhesive layer (II) is provided on a porous layer by a coating method.

In this case, according to an illustrative embodiment, the material configuring the adhesive layer (II) is dissolved in an organic solvent, which is then coated on one surface of the porous layer and is then dried. According to another illustrative embodiment, an aqueous resin emulsion, which includes the material configuring the adhesive layer (II), is coated on one surface of the porous layer.

The third aspect is equivalent to the configuration where the thermoplastic resin of the second aspect is changed to the organic solvent soluble resin or the aqueous resin emulsion, and the anti-blocking agent and the additive, which are the same as the second aspect, can be used. Therefore, the organic solvent soluble resin or the aqueous resin emulsion will be described below.

(Organic Solvent Soluble Resin)

The organic solvent soluble resin can be dissolved or dispersed by the organic solvent. A variety of additives are blended with an organic solvent solution (or dispersion liquid) of the organic solvent soluble resin, so that a coating material for the adhesive layer (II) is obtained.

As the organic solvent soluble resin, chlorinated polyolefins, ethylene/vinyl acetate copolymer, ethylene/(meth) acrylic acid ester copolymer, polyester-based resin and the like may be exemplified. Among them, from standpoints of the difference of the melting point from the base material layer (I) and the adhesiveness, ethylene/vinyl acetate copolymer and ethylene/(meth) acrylic acid ester copolymer are preferable.

As the organic solvent, toluene and acetic acid ethyl are preferable from standpoints of safety and the like.

A blending amount of the organic solvent soluble resin is preferably 70% to 100% by mass with respect to the total mass of the adhesive layer (II).

A solid content concentration of the coating material for the adhesive layer (II) is preferably 15% to 60%.

(Aqueous Resin Emulsion)

The aqueous resin emulsion is obtained by dispersing resin having the thermal adhesiveness in water. A variety of additives are blended with the aqueous resin emulsion to obtain the coating material for the adhesive layer (II).

As the resin having the thermal adhesiveness, olefinic resin, ethylene/vinyl acetate copolymer, ethylene/(meth) acrylic acid ester copolymer, polyester-based resin and the like may be exemplified. Among them, from standpoints of the difference of the melting point from the base material layer (I) and the adhesiveness, the olefinic resin is preferable.

An average particle size of the resin having the thermal adhesiveness in the aqueous resin emulsion is preferably 0.01 µm or greater, and more preferably 0.1 µm or greater from standpoints that a phase is stable and storage and coating performances of the liquid are excellent at the state of the dispersion liquid. In the meantime, the adhesive layer (II) formed by coating the coating material including the aqueous resin emulsion is preferably 3 µm or less, and more preferably 1 µm or less from a standpoint that the transparency is better, after bonding the label to the bottle by the in-mold forming (i.e., at the state of the resin molded product).

An average particle size of the adhesive layer material in the aqueous resin emulsion is calculated in following order. First, a sample solution (for example, an olefinic resin emulsion solution) is dried at low temperatures and reduced pressures. The dried sample is observed at an appropriate magnification (for example, a magnification of 1,000 times) by a scanning electron microscope and a photograph image thereof is captured. From the photograph image, an average value of 100 randomly selected particles sizes (long diameters) in the sample is calculated. Thereby, the average particle size is calculated.

In order to make the average particle size of the resin having the thermal adhesiveness be within the above range, the dispersant for dispersing the resin having the thermal adhesiveness may be added within a range that does not deteriorate the thermal adhesiveness of the label.

As the dispersant, a surfactant may be exemplified. As the surfactant, any of cationic, anionic, non-ionic and amphoteric surfactants may be used. Among them, cationic, anionic and non-ionic surfactants are preferable from standpoints that the surfactants are difficult to aggregate upon the blending with the other additives and do not deteriorate the thermal adhesiveness of the obtained label.

Examples of the manufacturing method of the aqueous resin emulsion may include the methods disclosed in JP-A-58-118843, JP-A-56-2149, JP-A-56-106940 and JP-A-56-157445.

As an example of the manufacturing method of the aqueous resin emulsion, the material (which may also be referred to as an adhesive layer material) configuring the adhesive layer is supplied to a biaxial screw extruder, and is melted and kneaded. Then, the water including the dispersion liquid is introduced through a liquid introduction pipe provided in a compression region or vent region of the extruder and the screw is rotated to knead the melted copolymer resin and the water. Then, the obtained kneaded solution is subjected to phase reverse processing in a housing of the extruder, is discharged to an atmospheric region through exit nozzles of the extruder and is accommodated in a reservoir with the water being further added, as required.

A solid content concentration of the resin having the thermal adhesiveness in the aqueous resin emulsion is preferably 8% to 60% by mass, and more preferably 20% to 50% by mass from standpoints that a phase is stable and storage and coating performances of the liquid are excellent at the state of the dispersion liquid.

Also, a solid content concentration in the coating material for the adhesive layer (II) is preferably 15% to 60%.

Manufacturing Method of In-Mold Label:

The molding method of the thermoplastic resin film is not particularly limited.

Any well-known method can be appropriately selected to mold the thermoplastic resin film.

The base material layer (I) can be formed by cast forming of extruding a molten resin into a sheet form through a monolayer or multilayer T die or I die connected to a screw extruder, calender forming, press-roll forming, inflation forming, a method of casting or calendering a mixture of the thermoplastic resin and an organic solvent or an oil and removing the solvent or oil, a method of coating or bonding a foamed material to a base material, a method of coating a foamed precursor material to a base material and foaming the same, and the like.

[Stretching]

Among them, the base material layer (I) is preferably stretched from a standpoint of conveniently manufacturing a porous film. For the stretching, a variety of methods to be conventionally used can be appropriately applied.

As the stretching method, vertical stretching that uses circumferential velocity differences between a group of rollers, horizontal stretching that uses a tenter oven, press-rolling, simultaneous biaxial stretching that uses a tenter oven and a linear motor in combination, and the like may be used. The stretching method may be single uniaxial stretching, multistage stretching that uses the same stretching method, simultaneous biaxial stretching that uses the same or two different techniques or serial biaxial stretching that uses the same or two or more different techniques.

When the resin is an amorphous resin, the stretching temperature is equal to or higher than the glass transition point of the thermoplastic resin used in the film, and when the resin is a crystalline resin, the stretching temperature is within a well-known temperature range from the glass transition point of the amorphous portion to the melting point of the crystalline portion, which is suited for the thermoplastic resin.

Among them, the stretching temperature is preferably lower than the melting point of the thermoplastic resin, which is the main component of the base material layer (I), by 2° C. to 60° C.

When the thermoplastic resin, which is the main component of the base material layer (I), is propylene homopolymer (melting point of 155° C. to 167° C.), the stretching setting temperature is preferably 140° C. to 164° C.

When the thermoplastic resin, which is the main component of the base material layer (I), is a high-density polyethylene (melting point of 121° C. to 134° C.), the stretching setting temperature is preferably 110° C. to 120° C.

When the thermoplastic resin, which is the main component of the base material layer (I), is polyethylene terephthalate (melting point of 246° C. to 252° C.), the stretching setting temperature is preferably 104° C. to 115° C.

Herein, the stretching setting temperature is a sheet temperature upon the stretching.

The stretching ratio and the stretching temperature are not particularly limited and are appropriately determined in conformity to the setting of the porosity of the base material layer (I).

That is, when the porosity of the base material layer (I) is too low, the entire transparency of the label is high, so that the light contrast is difficult to occur between the convex portion and the concave portion of the labeled molded container.

On the other hand, when the porosity of the base material layer (I) is too high, the entire transparency of the label is low, so that the light contrast is difficult to occur between the convex portion and the concave portion of the labeled molded container.

Also, since the generation easiness of the void is different depending on the type of the thermoplastic resin, too, the stretching ratio and the stretching temperature are appropriately determined in conformity to the setting of the porosity.

For example, when the thermoplastic resin is propylene homopolymer or a copolymer thereof, the stretching ratio for unidirectional stretching is preferably about 1.2 to 12 times, and more preferably 2 to 10 times. The stretching ratio for biaxial stretching is preferably 1.5 to 60 times, and more preferably 10 to 50 times in terms of an area stretching ratio.

When the other thermoplastic resin is used, the stretching ratio for unidirectional stretching is preferably about 1.2 to 10 times, and more preferably 2 to 5 times. The stretching ratio for biaxial stretching is preferably 1.5 to 20 times, and more preferably 4 to 12 times in terms of an area stretching ratio.

Also, the stretching rate is preferably 20 to 350 m/min from standpoints of improvement of the productivity and reduction in non-uniformity of the stretching.

As the forming method of the adhesive layer (II), a coextrusion method of arranging the adhesive layer (II) on one surface of the base material layer (I) and performing extrusion from a dice of two or more layers or a lamination method of forming the base material layer (I) and then extruding and laminating the adhesive layer (II) on one surface thereof is preferable, from standpoints of increasing the porosity of the base material layer (I) and decreasing the porosity of the adhesive layer (II).

In addition to the stretching forming, U.S. Pat. No. 5,326,391 discloses a method of removing a solvent or an oil after the forming and forming a solvent extract layer.

Also, U.S. Pat. No. 9,186,633 discloses a method of making a foamed layer by using a foamed material.

Upon the film formation, the porosity of the base material layer (I) is 5% to 60%, preferably 8% to 50%, and more preferably 8% to 40%. When the porosity is less than 5%, it is difficult to obtain the light contrast, and when the porosity is higher than 60%, it is difficult to secure the strength as the label.

In the disclosure, the porosity means a value that is to be calculated in accordance with the equation (2).

$$\text{porosity (\%)} = 100 \times (\rho_0 - \rho)/\rho_0 \qquad (2)$$

($\rho_0$: true density of label, $\rho$: density of label)

In the equation (2), $\rho_0$ indicates a true density, and $\rho$ indicates a density (measured by an underwater substitution method with pure water based on "A" method of JIS-K7112) of a label made of stretched film. The true density is substantially the same as the density of the label before stretching inasmuch as a material before stretching does not contain a large amount of air.

Also, when providing post-processing suitability such as printing suitability by an oil-based or radiation curable ink, laminate suitability by a non-woven fabric or foil and decoration suitability by a vapor deposition method, the in-mold label preferably has a multilayer structure of three or more layers where the base material layer (I) having a surface layer on one surface of the porous layer is laminated with the adhesive layer (II) on the other surface of the porous layer.

When manufacturing the in-mold label by the stretching forming, it preferably consists of a biaxially stretched layer or a biaxially stretched layer and an unstretched layer. The biaxially stretched layer has effects that it is easy to form the voids to be easily crushed by the heat and to obtain the light contrast. Also, the unstretched layer has an effect that it can easily conform to the concave-convex structure of the mold.

[Surface Treatment]

In order to prevent the blister upon the in-mold forming, the surface of the adhesive layer (II) of the in-mold label is preferably subjected to emboss processing so as to escape the air staying between the adhesive layer (II) and the mold.

The embossing method is disclosed in JP-A-2-84319 and JP-A-3-260689, for example.

The surface of the adhesive layer (II) is embossed in such a way that the emboss of 5 to 25 lines per 2.54 cm (one inch)

is made and a valley depth is 1 to 8 μm and is equal to or greater than 1/3 of the thickness of the adhesive layer.

The surface of the base material layer (I) of the in-mold label may be subjected to a surface oxidization treatment for improving the printing suitability and the decoration suitability.

As the surface oxidization treatment, a corona discharge treatment, a plasma treatment, a flame treatment, a glaze treatment and the like may be exemplified.

Also, a well-known surface treatment agent may be applied so as to provide a charge prevention property after the surface oxidization treatment and to keep the printing suitability and the decoration suitability.

[Preferable Aspect]

A preferable aspect is an extrusion lamination method of laminating a film (II) obtained by uniaxially stretching a resin composition for adhesive layer on a first surface of a film (I) obtained by biaxially stretching a resin composition for base material layer. In this case, the resin composition for base material layer preferably contains the inorganic fine powders of 5% to 40% by mass, the high-density polyethylene of 90% to 10% by mass, the auxiliary agent of 0 to 3% by mass, and the propylene-based resin of 5% to 50% by mass. At this time, a total sum of the inorganic fine powders, the high-density polyethylene, the auxiliary agent and the propylene-based resin is 100% by mass. Also, the resin composition for adhesive layer preferably contains the low-density polyethylene, the linear low-density polyethylene or the mixture of the low-density polyethylene and ethylene-vinyl acetate copolymer of 98% to 100% by mass and the auxiliary agent of 0 to 2% by mass. Also, a laminated body obtained by laminating a film (III) obtained by uniaxially stretching another resin composition on a second surface of the base material layer (II) as necessary is included. A particularly, preferable aspect is a coextrusion method which includes laminating a resin composition for skin layer, a resin composition for base material layer and a resin composition for adhesive layer in corresponding order at a melted state, coextruding from a dice and cooling the resultant to obtain a film including at least a configuration of the skin layer (III)/the base material layer (I)/the adhesive layer (II) and biaxially stretching the film. In this case, the resin composition for base material layer preferably contains the inorganic fine powders of 25% to 50% by mass, the high-density polyethylene of 50% to 70% by mass, the auxiliary agent of 0 to 3% by mass and the other thermoplastic resin of 0 to 10% by mass. At this time, a total sum of the inorganic fine powders, the high-density polyethylene, the auxiliary agent and the other thermoplastic resin is 100% by mass. Also, the skin layer (III) may be the same thermoplastic resin composition as the adhesive layer (II) or a different thermoplastic resin composition therefrom.

Physical Properties of In-mold Label:

[Thickness]

The thickness of the in-mold label is preferably 30 μm or greater, and more preferably 50 μm or greater from a standpoint of keeping the strength as the label. On the other hand, the thickness of the in-mold label is preferably 120 μm or less, and more preferably 100 μm or less from a standpoint of the lightness of the label.

The thickness of the base material layer (I) is preferably 20 μm or greater, and more preferably 40 μm or greater from a standpoint of covering the flat portion. On the other hand, the thickness of the base material layer (I) is preferably 100 μm or less, and more preferably 80 μm or less from the standpoint of the lightness of the label.

The thickness of the adhesive layer (II) is preferably 1 μm or greater, and more preferably 2 μm or greater from standpoints that the film of the adhesive layer (II) is melted by the heat of melted polyethylene or polypropylene such as parison upon the hollow forming and the molded container and the label are strongly fused. On the other hand, the thickness of the adhesive layer (II) is preferably 10 μm or less, and more preferably 8 μm or less from standpoints of preventing the label from being curled to make it difficult to perform the offset printing or to fix the label to the mold.

[Density]

The density of the in-mold label is preferably 0.45 g/cm$^3$ or higher, more preferably 0.50 g/cm$^3$ or higher and further preferably 0.55 g/cm$^3$ or higher from standpoints of the lightness of the label and the improvement on the effect of the light contrast. On the other hand, the density is preferably 1.02 g/cm$^3$ or lower and more preferably 0.90 g/cm$^3$ or lower from a standpoint of covering the flat portion. Also, the density of the in-mold label is preferably 0.7 to 0.95 times the density of the film before stretching. The density D of a sample is obtained from the mass W and the thickness H of 10 sheets of the sample by the equation (3) below. The size of the sample is usually 100 mm in length×100 mm in width, but it may be smaller if it is inevitable.

$$D=W\times 10000/H \tag{3}$$

[Opacity]

The opacity of the in-mold label is preferably 85 to 94 from the standpoint of the improvement on the effect of the light contrast. The opacity of the in-mold label is a value based on JIS P8149:2000 (ISO 2471:1998). Specifically, the reflectance (luminous reflectance) of the reflecting surface determined by the C light source, the 2° field of view, and the Y value of the tristimulus value is measured by an integrating sphere type colorimeter. The value obtained by the equation (4) below from the luminous reflectance Rvw measured by placing a white board on the back of the measurement surface of a sample and the luminous reflectance Rvb measured by placing a black board on the back of the measurement surface of the sample is set as the opacity value Op. The size of the sample is usually 75 mm×150 mm, but it may be smaller if it is inevitable. When more than two samples can be obtained, the median of the three opacity values is adopted.

$$Op=Rvb/Rvw\times 100 \tag{4}$$

[Tensile Properties]

In order for the in-mold label to conform to the three-dimensional structure of the container, the label is preferably fractured after the yield in the tensile property test. Also, the label is required not to be excessively stretched from a standpoint of making it difficult for a wrinkle to be formed in the label upon the in-mold formation. That is, the in-mold label preferably has the nominal tensile strain at break of 30% to 200%, which is defined in JIS K7161:1994. The nominal tensile strain at break is measured in accordance with "A" method of JIS K7161-1:2014, 10.2.2.2. Specifically, three samples with 15 mm width and 150 mm length are prepared and attached to a tensile tester. The distance L between the first jaws is adjusted to be 100±1 mm. Next, the sample is pull at a test speed of 200 mm/mm and record the increment Lt (mm) of the distance between the jaws when the sample breaks. Nominal tensile strain at break εt (%) is obtained by the equation (5):

$$\varepsilon t = L1/L\times 100 \tag{5}$$

Also, from the same reasons, a ratio of the nominal tensile strain at break in a machine direction (MD) upon the stretching and a direction (CD) perpendicular thereto is preferably within a range of 5:1 to 1:5.

[Gurley Type Bending Stiffness]

From the same reasons as the tensile properties, the in-mold label preferably has a value of 0.15 mN to 2.0 mN, as a value of Gurley stiffness test in accordance with TAPPI T543pm-84. Also, the Gurley value is preferably within a range of 3:1 to 1:3, as a ratio of CD and TD. Specifically, three samples with 88.9 mm in the measuring direction and 50.8 mm in the direction perpendicular thereto were prepared. Next, the sample is inserted by 6.35 mm to the chuck of the measuring device and fixed. The scale RG is read when the movable arm falls and the pendulum and the tip of the sample separate. Next, the Gurley type bending stiffness S (mN) is obtained by the equation (6):

$$Br=RG \times [D_1W_1+D_2W_2+D_3W_3/(5 \times D_1)] \times [(L-12.7)^2/b] \times [11.11/25.4] \quad (6)$$

RG: Scale when the sample leaves the pendulum (mgf)

$D_1$, $D_2$, $D_3$: Distance between the load mounting hole and the fulcrum $W_1$, $W_2$, $W_3$: Weight of mass mounting in load mounting hole (g)

L: Length of the sample b: Width of the sample

[Thermal Conductivity]

In order to bond the in-mold label to the container, the thermal conductivity of the in-mold label is preferably 0.04 W/mK to 0.11 W/mK in accordance with ISO 22007-3: 2008. Thermal conductivity by temperature wave analysis (TWA) is preferably 0.04 to 0.11 W/mK. Specifically describing from the view point of the principal of the TWA method, a sample having a known thickness d is heated in an AC form by varying the modulation frequency ω on one side of the sample, and the thermal diffusivity α is obtained by measuring the phase delay Δθ of the temperature change on the back side of the sample. The thermal conductivity λ (W/mK) can be obtained by multiplying the thermal diffusivity α by the sample density and the constant pressure specific heat capacity. The thermal conductivity can be preferably measured by simply setting a sample in a measuring machine Decoration of In-mold Label:

An opposite surface to the adhesive layer (II) of the in-mold label is preferably provided with one or more decoration layers selected from a group of an ink layer, an adhesion layer, a vapor deposition layer and a shaping layer in terms of the design for using as a label.

Among them, when used as the label, an ink layer is normally provided by the printing.

As the printing method, a general printing method with a plate or without a plate such as gravure printing, offset printing, flexography, screen printing, seal printing and the like may be exemplified.

As a color material for printing, an oil-based ink, a radiation curable ink (for example, ultraviolet curable ink), a liquid toner and the like maybe exemplified. As the component in the color material, in addition to the general dyes and pigments, special color materials such as photo luminescent pigments, dichroic pigments, fluorescent dyes, fluorescent pigments and the like may be used together.

As the printing information, a barcode, a manufacturer, a sales company name, a character, a product name, a using method, a warning notice and the like may be exemplified.

As the decoration method except for the printing, laminate by a non-woven fabric or foil, direct metal vapor deposition, transfer of a metal vapor deposition film, hologram, thread bonding and the like may be exemplified. The types and numbers of the decoration method including, the printing are not limited.

Also, it is possible to make a new outward appearance having combined the light contrast and the decoration by a method of exposing the connection portion near the apex portion or the connection portion near the bottom surface portion and covering the other portions, a method of covering the connection portion with a decoration having a low concealment property to provide colored contrast, or the like.

Also, it is possible to introduce the aesthetic resulting from the shape of the label into the design. The label may have such a shape that it is partially bonded to a part of the container surface or substantially makes one revolution around the container.

In-mold Forming:

[Cavity]

In the disclosure, a mold for in-mold forming has a cavity into which a label can be inserted, and the label insertion place of the cavity is engraved.

In order to remove the voids in the label of the labeled molded container, it is necessary to heating-melt the label with compressive stress in the thickness direction of the label, shear stress of the label and bending moment being applied, a height difference between the convex portion and the flat portion or a height difference between the concave portion and the flat portion is 0.1 mm or greater, and more preferably 2 mm or greater. In the meantime, when the tensile stress of the label and the shear stress of the label are too high, the label tends to break, for example. Therefore, the height difference is preferably 8 mm or less, and more preferably 5 mm or less.

A suction hole for sucking and fixing the label upon the in-mold forming is provided at the flat portion, not the concave portion or convex portion in the cavity.

[In-mold Forming]

The labeled molded container is molded using the in-mold forming method.

In a case of differential pressure forming of a sheet, any of the vacuum forming and the air-pressure forming may be used. However, from a standpoint of shaping, both forming methods are used together. Also, the air-pressure forming using a plug assist is preferable.

A sequence of the in-mold forming method in the differential pressure forming is as follows.

In the cavity of a lower female mold of a mold for differential pressure forming, the in-mold label is placed so that a printing-side of the label is contacted to the cavity surface of the mold.

Then, the in-mold label is fixed to an inner wall of the mold by mold suction.

Subsequently, a melt of a container forming material resin sheet is guided to above the lower female mold. In the case of the vacuum forming, the mold is held as it is, and in the case of the air-pressure forming, an upper mold is closed. Then, the differential pressure molding is performed by a typical method. After cooling the melt, a labeled container having the in-mold label integrated on an outer wall of the container is taken out of the mold.

Also, a sequence of the in-mold forming method in the hollow forming is as follows.

The in-mold label is inserted into the mold, and is arranged at a predetermined place in the mold. At this time, the label may be inserted using a robot.

The label is fixed to the inner wall of the mold by using a well-known technique such as suction or static electricity so that the position of the in-mold label placed in the mold does not deviate and the label is not dropped.

In the meantime, a mold of a blow-forming machine is preferably provided therein with a cooling pipe and the cooling water is enabled to circulate in the cooling pipe for cooling so as to improve the production efficiency by rapidly cooling a plastic container being molded. When blow-forming the plastic container, the cooling temperature of the mold is preferably 5° C. to 40° C., more preferably 7° C. to 30° C., and further preferably 10° C. to 25° C. Thereby, the mold is not overcooled, so that container deformation such as bulge or dent is difficult to be generated. Also, it is easy to increase the adhesion strength between the in-mold label and the plastic container. Also, a problem, which is to occur when dew condensation occurs on the mold surface, is difficult to occur.

Herein, the cooling temperature of the mold may be a numerical value obtained by directly measuring the outer wall of the mold with an infrared temperature gauge or the like. However, since it is normally thought that the cooling temperature of the mold is the same as that of the cooling water circulating inside the mold, it can be considered as the temperature of the cooling water.

Favorable examples of the plastic material to be used for the in-mold molded container may include the olefinic resins such as polypropylene, high-density polyethylene, low-density polyethylene, linear low-density polyethylene and the like. These materials are suitable for the blow forming and are favorable as the plastic material.

When the plastic material is melted and extruded into a form of a parison, the setting temperature of a dice for melting the plastic material is 150° C. or higher. The temperature is preferably within a range of 150° C. to 250° C., and more preferably within a range of 150° C. to 220° C. Thereby, the formed parison can also be set to 150° C. or higher.

The parison formed by melting and extruding the plastic material is also preferably 150° C. or higher, as the parison temperature immediately after the extrusion from the dice, like the dice temperature. The temperature is preferably within a range of 150° C. to 250° C., and more preferably within a range of 150° C. to 220° C. When the parison temperature is equal to or higher than 150° C., it is possible to sufficiently activate a heat sealing layer on the in-mold label. The parison temperature immediately after the extrusion can be directly measured by an infrared temperature gauge or the like.

When the plastic material is melted and extruded to form the parison of a desired length, the mold is clamped.

After the clamping, compressed air is introduced into the parison and the blow forming is performed to form the plastic container. Upon the blow forming, the blowing pressure of compressed air is preferably 3 to 7 kg/cm$^2$, more preferably 3 to 6 kg/cm$^2$, and further preferably 4 to 5 kg/cm$^2$. Thereby, it is possible to easily improve the adhesion strength between the in-mold label and the plastic container and the blisters are also difficult to be generated. Also, the blisters due to the first touch between the in-mold label and the parison are difficult to be generated.

The blowing time by the compressed air (container molding time) is preferably 5 seconds or longer, more preferably 5 to 50 seconds, and further preferably 10 to 30 seconds. Although the blowing time by the compressed air may change depending on a size of the container, if it is intended to shorten the blowing time by lowering the mold temperature, a large deviation occurs in a thermal hysteresis between the members, so that the container deformation such as bulge and dent is likely to be generated. When the blowing time by the compressed air is equal to or longer than 5 seconds, the container deformation such as bulge and dent is difficult to be generated.

After molding the plastic container by the blow forming, the mold is opened to discharge and take an in-mold labeled plastic container.

At this time, as discharge conditions, the temperature of the plastic container upon the discharge is preferably 120° C. or lower, more preferably 60° C. to 110° C., and further preferably 70° C. to 100° C. Thereby, a situation where the thermoplastic resin of the heat sealing layer of the label is discharged as it is melted does not occur. Also, the in-mold label stands out after the cooling of the discharged plastic container, so that the blisters are not generated.

A short cycle from the step of inserting the label into the mold to the step of discharging the container is preferably within a range of 20 to 60 seconds/cycle, as time, and is preferably within a range of 1 to 10/cycle, as the number of the plastic container having the in-mold label molded.

[Features of Labeled Molded Container]

During the in-mold forming, the label is stretched and shaped by heat and stress of the resin for molding, depending on the height difference of the concave-convex portion of the cavity.

However, the label is non-uniformly applied with heat and pressure.

Particularly, the compressive stress and heat are strongly applied at a place at which the label is bent by the mold.

As a result, the voids inside the label are lost along the boundary of the concave-convex portion of the cavity.

According to the labeled molded container manufactured in this way, the design inside the mold cavity is transferred to the container simultaneously with the in-mold forming.

In the region in which the label is fused, the flat portion and the convex portion or the concave portion or both portions are formed in correspondence to the concavity and convexity inside the cavity.

The convex portion includes an apex portion and an inclined portion, the apex portion and the inclined portion are connected by a connection portion, and the connection portion is translucent.

Also, the concave portion includes a bottom surface portion and an inclined portion, the bottom surface portion and the inclined portion are connected by a connection portion, and the connection portion is translucent.

The light transmission of the translucent connection portion is improved, so that a container of which the outlines of the convex portion and the concave portion are emphasized and an outward appearance is favorable is obtained.

Industrial Applicability

According to the disclosure, the label insert surface inside the mold cavity is provided with the concave-convex design. Therefore, it is possible to obtain the labeled molded container where the region in which the label is thermally fused is provided with the concave-convex pattern and to provide the concave-convex pattern with the light contrast.

For this reason, it is possible to add a new design to the decoration of the related art and to suppress the cost.

The technology of the disclosure can be widely applied to a molded product having an in-mold label.

EXAMPLES

Hereinafter, the disclosure will be more specifically described with manufacturing examples, sheet molding examples, examples, comparative examples and test examples.

The materials, using amounts, ratios, operations and the like to be described below can be appropriately changed without departing from the spirit of the disclosure. Therefore, the scope of the disclosure is not limited to specific examples to be described below.

[Measuring Methods]

(Density)

An in-mold label was cut to 100 mm in length×100 mm in width and the thickness (total thickness) of each label was measured with a constant-pressure thickness gauge (model name: PG-01J, manufactured by Teclock Co., Ltd.) according to JIS K7130:1999. The mass of the in-mold label was obtained by measuring the ten samples at once with an electronic balance and determining the density by the above equation (3).

(Opacity)

An in-mold label was cut to about 75 mm×150 mm, and the opacity was determined by the above procedure using a color difference meter (SM color computer manufactured by Suga Test Instruments Co., Ltd.).

(Nominal Tensile Strain at Break)

The nominal tensile strain at break was measured by a tensile tester (Shimadzu Autograph AGS-5 kNJ, manufactured by Shimadzu Corporation). The load cell and chuck for 1,000 N or 5,000 N were appropriately selected for the measurement.

(Gurley Bending Resistance)

Gurley bending resistance was measured by the above procedure for MD direction and TD direction at 23° C., 50% RH with a Gurley stiffness tester (GAS-100 manufactured by Daiei Scientific Seiki Seisakusho Co., Ltd.). Normally, 5 g weights were mounted in a hole No. 1 for the measurement.

(Thermal Conductivity)

An in-mold label was cut to about 50 mm×50 mm and the thermal conductivity of the label was measured by a thermal conductivity measuring instrument (Eye Phase Mobile 1u manufactured by Eye Phase Co., Ltd.).

Manufacturing Examples

[Manufacturing of Biaxially Stretched Film of Three-Layered Structure]

Manufacturing Example 1

The materials shown in Table 1 were used, and the raw materials for the base layer (A) were melted and kneaded with the ratios shown in Table 2 by an extruder of which temperature was set to 180° C. Likewise, the raw materials for the surface layer (B) were melted and kneaded by a separate extruder of which temperature was set to 180° C. Also, the raw materials for the backside layer (C) were melted and kneaded by a separate extruder of which temperature was set to 180° C.

Then, the raw materials of the respective layers were respectively supplied to a T die of which temperature was set to 190° C., and the lamination was made in order of the surface layer (B)/the base layer (A)/the backside layer (C) in the die.

Then, the three-layered raw material was extruded into a sheet form from the T die, which was cooled to about 60° C. with cooling rolls to obtain an unstretched sheet.

The unstretched sheet was then stretched in the vertical direction by four times by using the circumferential velocity difference of a group of rolls at the sheet temperature 110° C. The sheet was then cooled to about 60° C. by the cooling rolls, so that a vertically uniaxially stretched sheet was obtained.

Then, the stretched sheet was stretched in the transverse direction by 9 times with a tentor at the sheet temperature 128° C. The sheet was then annealed to 130° C. in a heat setting zone, was cooled to about 60° C. by the cooling rolls, and was wound with an ear portion being slit, so that a biaxially stretched ethylene-based film of a three-layered structure was obtained.

The thickness of the ethylene-based film of Manufacturing Example 1 was 130 μm, and the density was 0.62 g/cm$^3$.

Manufacturing Example 2

Manufacturing Example 2 was the same as Manufacturing Example 1, except that the raw materials shown in Table 2 were used instead of the materials of Manufacturing Example 1, the setting temperature of the extruder for melting and kneading was changed to 200° C., the setting temperature of the T die was changed to 200° C., the stretching conditions were changed as shown in Table 2 and the temperature of the heat setting zone was changed to 165° C. As a result, a biaxially stretched polypropylene-based film of a three-layered structure was obtained.

The thickness of the polypropylene-based film of Manufacturing Example 2 was 107 μm, and the density was 0.77 g/cm$^3$.

Manufacturing Example 3

The materials shown in Table 1 were used, and the raw materials for the base layer (A) were melted and kneaded with the ratios shown in Table 2 by an extruder of which temperature was set to 200° C., supplied to a monolayer T die, and extruded into a film shape from the T die, which was cooled to about 60° C. with cooling rolls to obtain an unstretched sheet.

The unstretched sheet was then stretched in the vertical direction by four times by using the circumferential velocity difference of a group of rolls at the sheet temperature 100° C. The sheet was then cooled to about 60° C. by the cooling rolls, so that a vertically uniaxially stretched sheet was obtained.

Then, the raw materials for the surface layer (B) were melted and kneaded by a separate extruder of which temperature was set to 200° C. Also, the raw materials for the backside layer (C) were melted and kneaded by a separate extruder of which temperature was set to 200° C.

Then, the raw materials for the surface layer (B) were extruded into a film shape from the monolayer T die and laminated on one surface of the vertically uniaxially stretched sheet. Subsequently, the raw materials for the backside layer (C) were extruded into a film shape from the monolayer T die and laminated on one surface of the vertically uniaxially stretched sheet.

Then, the stretched sheet was stretched in the transverse direction by 9 times with the tentor at the sheet temperature 120° C. The sheet was then subjected to heating and cooling processing at 165° C. in the heat setting zone, was cooled to about 60° C. by the cooling rolls, and was wound with an ear portion being slit, so that a biaxially stretched polypropylene-based film of a three-layered structure was obtained.

The thickness of the polypropylene-based film of Manufacturing Example 3 was 83 μm, and the density was 0.81 g/cm$^3$.

Table 1 shows the materials used, Table 2 shows the manufacturing conditions of the films in the manufacturing examples 1 to 3, and Table 3 shows the physical properties of the films in the manufacturing examples 1 to 3.

TABLE 1

| Type | Abbreviation | Materials | Product name | Manufacturer | MFR (JIS K 7210: 1999) | Melting peak temperature (JIS K 7121: 1987) | Volume average particle size |
|---|---|---|---|---|---|---|---|
| Thermoplastic resin | PE-1 | High-density polyethylene | NOVATEC HD HF560 | Japan Polyethylene Corporation | 7 g/10 min. | 134° C. | — |
|  | PE-2 | High-density polyethylene | NOVATEC HD HB420R | Japan Polyethylene Corporation | 0.2 g/10 min. | 133° C. | — |
|  | PP-1 | Propylene/ethylene/butene random copolymer | NOVATEC PP FW4B | Japan Polypropylene Corporation | 7 g/10 min. | 138° C. | — |
| Inorganic fine powder | CA-1 | Heavy calcium carbonate | SOFTON #1200 | Bihoku Funka Kogyo, Co., Ltd., | — | — | 1.8 μm |
|  | TI-1 | Rutile titanium dioxide | TIPAQUE CR-60 | Ishihara Sangyo Kaisha, Ltd. | — | — | 0.2 μm |

(—: indicates there is no data)

TABLE 2

| | Blending ratio of raw materials used | | | | | | | | | | Stretching conditions | | | |
|---|---|---|---|---|---|---|---|---|---|---|---|---|---|---|
| | Base layer (A) | | | | Surface layer (B) | | | | Backside layer (C) | | Machine-direction stretching | | Transverse stretching | |
| Stretched film | PP1 (wt %) | PE1 (wt %) | CA1 (wt %) | TI1 (wt %) | PP1 (wt %) | PE1 (wt %) | CA1 (wt %) | TI1 (wt %) | PP1 (wt %) | PE1 (wt %) | Temperature (° C.) | ratio (times) | Temperature (° C.) | ratio (times) |
| Manufacturing Example 1 | 0 | 77 | 22 | 1 | 0 | 96 | 2 | 1 | 0 | 100 | 100 | 3 | 120 | 8 |
| Manufacturing Example 2 | 77 | 0 | 22 | 1 | 96 | 0 | 2 | 1 | 100 | 0 | 110 | 4 | 130 | 9 |
| Manufacturing Example 3 | 77 | 0 | 22 | 1 | 96 | 0 | 2 | 1 | 100 | 0 | 110 | 4 | 130 | 9 |

TABLE 3

| Stretched film | Thickness (μm) | Density (g/cm³) | Opacity (%) | Nominal tensile strain at break MD (%) | Nominal tensile strain at break CD (%) | Gurley bending resistance MD (mN) | Gurley bending resistance CD (mN) | Thermal conductivity (W/mK) |
|---|---|---|---|---|---|---|---|---|
| Manufacturing Example 1 | 130 | 0.62 | 97 | 112 | 103 | 1.8 | 2.0 | 0.04 |
| Manufacturing Example 2 | 107 | 0.77 | 95 | 120 | 20 | 1.0 | 1.9 | 0.06 |
| Manufacturing Example 3 | 83 | 0.81 | 90 | 110 | 16 | 0.31 | 0.52 | 0.10 |

[Manufacturing of Labeled Hollow Molded Container]

Example 1

A 0.4 mold for in-mold forming where a cavity in which a label could be inserted was provided and the label insertion portions of the cavity were engraved with depths 1 mm and 3 mm, a width 5 mm and an angle of 90° was prepared.

The mold was mounted to an in-mold blow forming machine, and the label of Manufacturing Example 1 was inserted and fixed into the cavity.

Then, the thermoplastic material (PE-2 in Table 1), which was a material of a body part of a hollow molded container, was melted at 200° C. and was extruded into a mold of which cooling temperature was set 20° C., as the parison. The mold was then clamped, the compressed air of 30 N/cm² was supplied into the parison, and the parison was expanded for 20 seconds into a container shape in contact with the mold and was fused to the label. The molded product was then cooled inside the mold and removed from the mold to obtain a labeled hollow molded container of Example 1. From the engraved portion having the depth 1 mm, an alphabet "P" stood out, and from the engraved portion having the depth 3 mm, an alphabet "O" stood out.

Examples 2 and 3

By performing the same processes as Example 1 except that the labels of Manufacturing Examples 2 and 3 were used instead of the label of Manufacturing Example 1 in Example 1, labeled hollow molded containers of Examples 2 and 3 were obtained.

Table 4 shows characteristic values of the labeled hollow molded container.

[Evaluation Methods]

(Number of Voids)

The cutting was made at two places so as to traverse the alphabet letter "P" of the labeled hollow molded container, which was then embedded with the epoxy resin and solidified. Then, a cut surface was made using microtome and was bonded to an observation sample stand. Then, the observation surface was vapor-deposited with gold-palladium and the voids of the surface were observed at a magnification of 500 times by an electron microscope (a scanning electron microscope S-2400 of Hitachi, Ltd.). The cross section was observed in a region 11 of FIG. 1 (the convex portion apex surface of the letter "P") and a region 12 (between the convex portion and the flat portion of the letter "P").

Then, an observation image was image-processed by an image analysis apparatus (Model Luzex IID of Nireco Co., Ltd.), and a region where the voids and the inorganic fine powders were was colored to green so as to easily count the number of the voids.

Then, 12 lines were drawn at equal intervals in the thickness direction of the cross section. The number of voids on each of ten lines except for two lines of both ends was counted, and data of 10 points was averaged, which was then set as the number of voids.

(Void Decrease Ratio)

The void decrease ratio was calculated from the number of voids $N_{11}$ in the region 11 and the number of voids $N_{12}$ in the region 12 by using the following equation.

$$(1-N_{12}/N_{11})\times 100 \quad (1)$$

(Light Contrast)

In a dark place, the light was illuminated from the backside of the labeled hollow molded container with a pen type lighting device, so that the light transmission of the convex portion was observed with naked eyes and determined in accordance with following standards.

A (Excellent): The outward appearance of the convex portion was strongly bright without diming.

B (Good): The outward appearance of the convex portion was slightly faintly bright.

C (Acceptable): The outward appearance of the convex portion was faintly bright.

D (Unacceptable): The outward appearance of the convex portion was not bright.

DESCRIPTION OF REFERENCE NUMERALS

1: in-mold molded container
2: flat portion
3: convex portion
4: edge portion
11: container main body
12: in-mold label
13: flat portion
14: convex portion
15: edge portion
16: observation region of convex portion apex surface of letter "P"
17: observation region between convex portion and flat portion of letter "P"

The invention claimed is:

1. A labeled molded container having a container main body and a label,
wherein a label surface is provided with a flat portion, a concave-convex pattern including a convex portion or a concave portion, and an edge portion between the convex portion or concave portion and the flat portion,
wherein when observing the labeled molded container from a surface-side thereof by illuminating light from a backside of the container, the edge portion is seen brighter than the flat portion and the concave-convex pattern and
wherein a void decrease ratio expressed by the following relationship is 15% to 99%, $(1-N_{12}/N_{11})\times 100$
where $N_{11}$ is a number of interface voids in a thickness direction on a convex portion apex surface or on a concave portion bottom surface, and $N_{12}$ is a number of interface voids in a thickness direction at the edge portion.

2. The labeled molded container according to claim 1, wherein the label consists of a biaxially stretched layer or a biaxially stretched layer and an unstretched layer.

3. The labeled molded container according to claim 1, wherein a wall of the container and the label are integrated to comprise the convex portion or the concave portion.

4. The labeled molded container according to claim 1, wherein the void decrease ratio is equal to or higher than 30%.

5. The labeled molded container according to claim 1, wherein the void decrease ratio is equal to or higher than 50%.

TABLE 4

| Labeled hollow molded container | Stretched film | Apex portion of convex portion (region 11) | | Edge portion (region 12) | | void decrease ratio (%) | Light contrast |
|---|---|---|---|---|---|---|---|
| | | | Average | | Average | | |
| Example 1 | Manufacturing Example 1 | 13, 14, 15, 13, 12, 15, 13, 15, 13, 11 | 13.4 | 3, 4, 4, 5, 4, 5, 3, 4, 3, 3 | 3.8 | 71.6 | A |
| Example 2 | Manufacturing Example 2 | 23, 27, 24, 24, 23, 24, 23, 22, 23, 23 | 23.6 | 16, 15, 17, 15, 15, 15, 17, 13, 13, 12 | 14.8 | 37.3 | B |
| Example 3 | Manufacturing Example 3 | 14, 14, 15, 15, 17, 12, 15, 18, 19, 17 | 15.6 | 17, 13, 14, 14, 16, 11, 13, 15, 17, 15 | 14.5 | 7.1 | D |

From Table 4, when the void decrease ratio was 15% to 99%, the labeled molded container exhibiting the light contrast was obtained. In the meantime, it can be seen that the film consisting of the biaxially stretched layer is favorable as the stretched film.

6. The labeled molded container according to claim 1, wherein the void decrease ratio is equal to or higher than 65%.

7. The labeled molded container according to claim 1, wherein the void decrease ratio is equal to or less than 96%.

8. The labeled molded container according to claim 1, wherein the void decrease ratio is equal to or less than 90%.

9. The labeled molded container according to claim 1, wherein the void decrease ratio is equal to or greater than 65% and equal to or less than 90%.

10. The labeled molded container according to claim 1, wherein the concave-convex pattern and the edge portion are provided so as to correspond to design indicia of the label.

11. The labeled molded container according to claim 10, wherein the edge portion defines a peripheral edge of the design indicia of the label.

12. The labeled molded container according to claim 1, wherein the convex portion includes an apex portion and an inclined portion, the apex portion and the inclined portion being connected by a connection portion, the connection portion being translucent.

13. The labeled molded container according to claim 1, wherein the concave portion includes a bottom surface portion and an inclined portion, the bottom surface portion and the inclined portion being connected by a connection portion, the connection portion being translucent.

14. A labeled molded container having a container main body and a label,
   wherein a label surface is provided with a flat portion, a concave-convex pattern including a concave portion or a concave portion, and an edge portion between the convex portion or the concave portion and the flat portion,
   wherein, when observing the label molded container from a surface side thereof by illuminating light from a backside of the container, the edge portion is seen brighter than the flat portion and the concave-convex portion, and
   wherein the concave-convex pattern and the edge portion are provided so as to correspond to design indicia of the label and the edge portion defines a peripheral edge of the design indicia of the label.

15. The labeled molded container according to claim 14, wherein the convex portion includes an apex portion and an inclined portion, the apex portion and the inclined portion being connected by a connection portion, the connection portion being translucent.

16. The labeled molded container according to claim 14, wherein the concave portion includes a bottom surface portion and an inclined portion, the bottom surface portion and the inclined portion being connected by a connection portion, the connection portion being translucent.

17. The labeled molded container according to claim 14, wherein the label consists of a biaxially stretched layer or a biaxially stretched layer and an unstretched layer.

18. The labeled molded container according to claim 14, wherein a wall of the container and the label are integrated to comprise the convex portion or the concave portion.

\* \* \* \* \*